(12) United States Patent
Han et al.

(10) Patent No.: US 12,245,024 B2
(45) Date of Patent: Mar. 4, 2025

(54) METHOD AND APPARATUS FOR PERFORMING UWB SECURE RANGING

(71) Applicant: Samsung Electronics Co., Ltd., Gyeonggi-do (KR)

(72) Inventors: Sehee Han, Gyeonggi-do (KR); Sungkyu Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 304 days.

(21) Appl. No.: 17/746,316

(22) Filed: May 17, 2022

(65) Prior Publication Data
US 2022/0369103 A1 Nov. 17, 2022

(30) Foreign Application Priority Data
May 17, 2021 (KR) .......... 10-2021-0063701

(51) Int. Cl.
*H04W 12/03* (2021.01)
*H04B 1/7163* (2011.01)
*H04L 9/32* (2006.01)

(52) U.S. Cl.
CPC ........ *H04W 12/03* (2021.01); *H04B 1/71632* (2013.01); *H04L 9/3263* (2013.01); *H04B 2201/71634* (2013.01)

(58) Field of Classification Search
CPC ... H04W 12/03; H04W 12/043; H04W 12/35; H04L 9/085; H04L 63/045; H04L 9/0822;
(Continued)

(56) References Cited

U.S. PATENT DOCUMENTS

2012/0072714 A1* 3/2012 Grandcolas ......... H04L 63/0853
713/155
2014/0122878 A1 5/2014 Cho et al.
(Continued)

FOREIGN PATENT DOCUMENTS

WO WO 2019/067056 4/2019
WO WO 2020/069311 4/2020

OTHER PUBLICATIONS

ETSI TR 103 181-1 V1.1.1, Short Range Devices (SRD) using Ultra Wide Band (UWB); Technical Report, Part 1: UWB Signal Characteristics and Overview CEPT/ECC and EC Regulation, Jul. 2015, 53 pages.
(Continued)

*Primary Examiner* — Farid Homayounmehr
*Assistant Examiner* — Brian William Avery
(74) *Attorney, Agent, or Firm* — The Farrell Law Firm, P.C.

(57) ABSTRACT

Disclosed is a method for ultra-wide band (UWB) security ranging and a UWB device configured to perform secure ranging. The method includes obtaining, from a UWB sub-system of the UWB device, first encryption data including a symmetric key encrypted with a public key of a secure application of the UWB device; transferring the first encryption data to the secure application; obtaining, from the secure application, second encryption data including a ranging data set (RDS) encrypted with the symmetric key; and transferring the second encryption data to the UWB sub-system. In this case, the RDS may include a ranging session key configured to secure a UWB ranging session, and the secure application may be included in a trusted execution environment area.

16 Claims, 12 Drawing Sheets

(58) Field of Classification Search
CPC ..... H04L 9/0838; H04L 9/0877; H04L 9/088; H04L 9/0897; H04L 9/3247; H04L 9/3263; H04L 2209/80; H04L 2463/06; H04B 1/71632; H04B 2201/71634
See application file for complete search history.

(56) References Cited

U.S. PATENT DOCUMENTS

2019/0116619 A1*  4/2019  Hauck ................ H04L 63/0869
2019/0135229 A1   5/2019  Ledvina et al.
2021/0058252 A1   2/2021  Jung et al.
2022/0255931 A1*  8/2022  Avetisov ............... H04L 9/3263

OTHER PUBLICATIONS

International Search Report dated Aug. 22, 2022 issued in counterpart application No. PCT/KR2022/007062, 6 pages.

\* cited by examiner

METHOD AND APPARATUS FOR PERFORMING UWB SECURE RANGING

CROSS-REFERENCE TO RELATED APPLICATION(S)

This application is based on and claims priority under 35 U.S.C. § 119 to Korean Patent Application No. 10-2021-0063701, filed on May 17, 2021, in the Korean Intellectual Property Office, the entire disclosure of which is incorporated herein by reference.

BACKGROUND

1. Field

The disclosure relates generally to ultra-wide band (UWB) communication and, more specifically, to a method and device for performing UWB secure ranging.

2. Related Art

The Internet is evolving from the human-centered connection network by which humans create and consume information to the Internet of things (IoT) network by which information is communicated and processed between things or other distributed components. Another arising technology is the Internet of everything (IoE), which is a combination of big data processing technology and the IoT technology through a cloud server connection, for example.

Implementing IoT requires technical elements, such as sensing technology, a wired/wireless communication and network infrastructure, service interface and security technologies. Research is ongoing for thing-to-thing connection on techniques for sensor networking, machine-to-machine (M2M), or machine-type communication (MTC).

In an IoT environment, intelligent Internet technology services may be offered that collect and analyze the data generated by the things connected with one another. IoT may have various applications, such as smart homes, smart buildings, smart cities, smart cars or connected cars, smart grids, health-care, or smart appliance industries, or state-of-art medical services, through conversion or integration of conventional information technology techniques and various industries.

As wireless communication systems evolve to provide various services, a need arises for a method for effectively providing such services. For example, it is possible to use a ranging technique for measuring the distance between electronic devices using UWB.

SUMMARY

The disclosure has been made to address at least the above-mentioned problems and/or disadvantages and to provide at least the advantages described below.

An aspect of the disclosure is to provide a method for sharing a key used for encrypting a ranging parameter used for UWB secure ranging between a UWB subsystem and a secure component.

Another aspect of the disclosure is to provide a method for transferring a ranging data set (RDS) encrypted by a shared key from a secure component to a UWB subsystem.

In accordance with an aspect of the disclosure, a method for performing secure ranging that includes obtaining, from an ultra-wide band (UWB) sub-system of a UWB device, first encryption data including a symmetric key encrypted with a public key of a secure application of the UWB device, transferring the first encryption data to the secure application, obtaining, from the secure application, second encryption data including an RDS encrypted with the symmetric key, and transferring the second encryption data to the UWB sub-system. The symmetric key may be generated and encrypted by the UWB sub-system. The RDS may include a ranging session key configured to secure the UWB ranging session. The secure application may be included in a trusted execution environment (TEE) area.

In accordance with another aspect of the disclosure, a UWB device configured to perform secure ranging includes a memory, a transceiver, and a controller operationally connected with the memory and the transceiver. The controller may be configured to obtain, from a UWB sub-system of the UWB device, first encryption data including a symmetric key encrypted with a public key of a secure application of the UWB device and transfer the first encryption data to the secure application and obtain, from the secure application, second encryption data including a RDS encrypted with the symmetric key and transfer the second encryption data to the UWB sub-system. The symmetric key may be generated and encrypted by the UWB sub-system. The RDS may include a ranging session key configured to secure the UWB ranging session. The secure application may be included in a TEE area.

The method for sharing a key used to encrypt a ranging parameter increases efficiency and encryption security. Also, the method for transferring an RDS encrypted by a shared key increases efficient performance and ranging security.

BRIEF DESCRIPTION OF THE DRAWINGS

The above and other aspects, features, and advantages of certain aspects of the disclosure will be more apparent from the following detailed description taken in conjunction with the accompanying drawings, in which.

DETAILED DESCRIPTION

Figure 1:
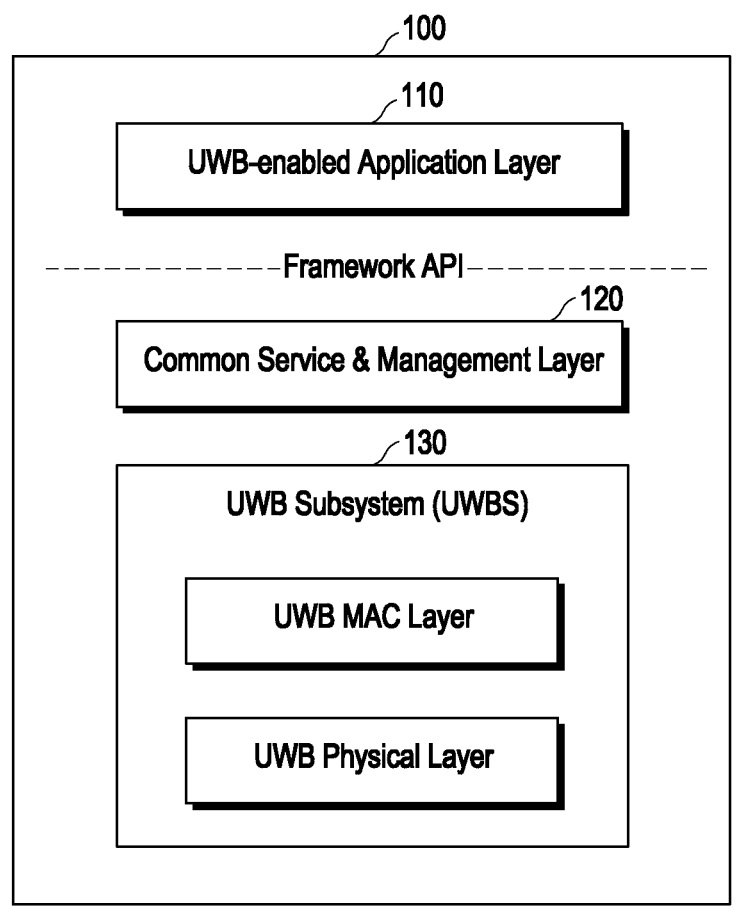
FIG. 1 illustrates an electronic device supporting a UWB-based service.

Hereinafter, various embodiments are described in detail with reference to the accompanying drawings.

In describing embodiments, the description of technologies that are known in the art and are not directly related to the present invention is omitted. This is for further clarifying the gist of the present disclosure without making the present disclosure unclear.

For the same reasons, some elements may be exaggerated or schematically shown. The size of each element does not necessarily reflect the actual size of the element. The same reference numeral is used to refer to the same element throughout the drawings.

Advantages and features, and methods for achieving the same may be understood through the embodiments to be described below taken in conjunction with the accompanying drawings. However, the present disclosure is not limited to the embodiments disclosed herein, and various changes may be made thereto. The embodiments disclosed herein are provided only to inform one of ordinary skilled in the art of the category of the present disclosure. The present disclosure is defined only by the appended claims. The same reference numeral denotes the same element throughout the specification.

The blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term unit means a software element or a hardware element such as a field-programmable gate array (FPGA) or an application specific integrated circuit (ASIC). A unit plays a certain role. However, the term unit is not limited as meaning a software or hardware element. A unit may be configured in a storage medium that may be addressed or may be configured to reproduce one or more processors. Accordingly, as an example, a unit includes elements, such as software elements, object-oriented software elements, class elements, and task elements, processes, functions, attributes, procedures, subroutines, segments of program codes, drivers, firmware, micro codes, circuits, data, databases, data architectures, tables, arrays, and variables. A function provided in an element or a unit may be combined with additional elements or may be split into sub elements or sub units. Further, an element or a unit may be implemented to reproduce one or more CPUs in a device or a security multimedia card. According to embodiments, a unit may include one or more processors.

As used herein, the term terminal or device may also be referred to as a mobile station (MS), user equipment (UE), user terminal (UT), terminal, wireless terminal, access terminal (AT), subscriber unit, subscriber station (SS), wireless device, wireless communication device, wireless transmit/receive unit (WTRU), mobile node, or mobile or may be referred to in other terms. Various embodiments of the terminal may include cellular phones, smart phones with wireless communication capabilities, personal digital assistants (PDAs) with wireless communication capabilities, wireless modems, portable computers with wireless communication capabilities, capturing/recording/shooting/filming devices, such as digital cameras, having wireless communication capabilities, game players with wireless communications capabilities, music storage and playback home appliances with wireless communications capabilities, Internet home appliances capable of wireless Internet access and browsing, or portable units or terminals incorporating combinations of those capabilities. Further, the terminal may include a M2M terminal and a MTC terminal/device, but is not limited thereto. In the disclosure, the terminal may be referred to as an electronic device or simply as a device.

Hereinafter, the operational principle of the disclosure is described below with reference to the accompanying drawings. When determined to make the subject matter of the present disclosure unclear, the detailed of the known functions or configurations may be skipped. The terms as used herein are defined considering the functions in the present disclosure and may be replaced with other terms according to the intention or practice of the user or operator. Therefore, the terms should be defined based on the overall disclosure.

Hereinafter, embodiments are described in detail with reference to the accompanying drawings. Further, although a communication system using UWB is described in connection with embodiments of the present disclosure, as an example, embodiments of the present disclosure may also apply to other communication systems with similar technical background or features. For example, a communication system using Bluetooth or ZigBee may be included therein. Further, embodiments of the present disclosure may be modified in such a range as not to significantly depart from the scope of the present disclosure under the determination by one of ordinary skill in the art and such modifications may be applicable to other communication systems.

When determined to make the subject matter of the present disclosure unclear, the detailed description of the known art or functions may be skipped. The terms as used herein are defined considering the functions in the present disclosure and may be replaced with other terms according to the intention or practice of the user or operator. Therefore, the terms should be defined based on the overall disclosure.

In general, wireless sensor network technology is largely divided into a wireless local area network (WLAN) technology and a wireless personal area network (WPAN) technology according to the recognition distance. In this case, WLAN is a technology based on IEEE 802.11 which enables access to the backbone network within a radius of about 100 m. WPAN is a technology based on IEEE 802.15 which includes Bluetooth, ZigBee, and UWB. A wireless network in which such a wireless network technology is implemented may include a plurality of electronic devices.

According to the definition of the Federal Communications Commission (FCC), UWB may refer to a wireless communication technology that uses a bandwidth of 500 MHz or more or a bandwidth corresponding to a center frequency of 20% or more. UWB may mean a band itself to which UWB communication is applied. UWB may enable secure and accurate ranging between devices.

Operations of a UWB-based service may include a service initiation step for initiating the UWB-based service, a key provisioning step for providing a key for security, a discovery step for discovering a device, a connection step including secure channel creation and parameter exchange, and/or a UWB ranging step for measuring a distance/direction (angle) between devices. According to some embodiments, some steps may be omitted or additional steps may be added.

The terminology used herein is provided for a better understanding of the disclosure, and changes may be made thereto without departing from the technical spirit of the disclosure.

Application dedicated file (ADF) may be, e.g., a data structure capable of hosting application specific data or security data (e.g., credential, cryptographic key) used by an application or SE (e.g., embedded SE (eSE)).

Application protocol data unit (APDU) may be a command and a response used when communicating with a secure element (eSE).

Application specific data may be, e.g., data used by a specific service and application regardless of the place (e.g., applet, device, etc.).

Controller may be a ranging device that defines and controls ranging control messages (RCM) (or control messages). In the disclosure, the ranging device may be, e.g., a ranging device (RDEV) or an enhanced ranging device (ERDEV) as defined in the IEEE Std 802.15.4/4z standard.

Controllee may be a ranging device using a ranging parameter in the RCM (or control message) received from the controller.

Unlike static STS, dynamic scrambled timestamp sequence (STS) may be an operation mode in which the STS is not repeated during a ranging session. In an embodiment, the STS may be managed by the ranging device, and the ranging session key that generates STS may be managed by a secure component.

Applet may be an applet that implements an APDU interface running on a secure component and is identified by an application (applet) ID (AID). This applet may host the data needed for secure ranging. In an embodiment, the applet may be, e.g., a FiRa applet.

"Ranging device" is a device that may communicate with another ranging device using a pre-defined profile (e.g., UWB-enabled door lock) or a device capable of supporting a pre-defined UWB ranging service for performing a ranging session with another ranging device. In this disclosure, the ranging device may be referred to as a UWB device or a UWB ranging device. In an embodiment, the ranging device may be, e.g., a FiRa device.

UWB-enabled application may be an application using a Framework API for configuring an OOB Connector, a Secure Service, and/or a UWB service for a UWB session. In this disclosure, UWB-enabled Application may be abbreviated as an application or a UWB application. In an embodiment, the UWB-enabled application may be, e.g., a FiRa-enabled application.

Framework may be, e.g., a collection of logical software components including an out-of-band (OOB) connector, secure Service, and/or UWB service. In an embodiment, the framework may be, e.g., FiRa Framework.

OOB Connector may be a software component for establishing OOB communication (e.g., Bluetooth low energy communication) between ranging devices. In an embodiment, the OOB connector may be, e.g., a FiRa OOB connector.

Profile may be a previously defined set of UWB and OOB configuration parameters. In an embodiment, the profile may be, e.g., a FiRa profile.

Profile manager may implement a profile available on the ranging device. In an embodiment, the profile manager may be, e.g., a FiRa profile manager.

Smart ranging device may be a ranging device (e.g., physical access reader) capable of hosting one or more UWB-enabled applications and implementing the framework or a ranging device that implements a specific screen application provided by the manufacturer. The smart ranging device may be a ranging device capable of installing multiple UWB-enabled applications to support a UWB ranging-based service to perform a ranging session with another ranging device or smart ranging device. In an embodiment, the smart ranging device may be, e.g., a FiRa smart device.

Global dedicated file (GDF) may be a root level of application specific data including data required to establish a USB session.

Framework application programming interface (API) may be an API used by a UWB-enabled Application to communicate with the Framework.

Initiator may be a Ranging Device that initiates a ranging exchange.

Object identifier (OID) may be an identifier of the ADF in the application data structure or a unique ID for identifying a service provider (SP).

OOB may be data communication that does not use UWB as an underlying wireless technology.

Responder may be a ranging device that responds to the Initiator in a ranging exchange.

STS may be a ciphered sequence for increasing the integrity and accuracy of ranging measurement timestamps. In an embodiment, the STS may be generated from the ranging session key.

Secure channel may be a data channel that prevents overhearing and tampering.

Secure component may be a component that interfaces with UWBS for the purpose of providing RDS to UWBS, e.g., when dynamic STS is used. It may also host UWB-enabled application data.

SE may be a tamper-resistant secure hardware component that may be used as a secure component in the Ranging Device.

Secure service may be a component for interfacing with the secure component of the system, such as a TEE or secure element.

Static STS is an operation mode in which STS is repeated during a session, and does not need to be managed by the secure component.

Secure UWB service (SUS) applet may be an applet on the secure component operating as an end point for the secure channel between secure components, such as UWBS and SE.

UWB service may be a component that provides access to the UWBS.

UWB session may be a session that may be established when the controller and controllee(s) may start UWB ranging. A UWB session may be a period from when the controller and the controlee start communication through UWB until when the controller and the controleo stop the communication. A UWB Session may include ranging, data transfer, and both.

UWB session ID may be an ID (e.g., an integer) for identifying the UWB session.

UWB Session Key may be a key used to protect the UWB Session. In an embodiment, the UWB session key may be used to generate the STS. In this disclosure, the UWB Session Key may be a UWB Ranging Session Key (URSK), and may be abbreviated as a session key.

UWB Subsystem (UWBS) may be a hardware component implementing the UWB PHY and MAC specifications. UWBS may have an interface to framework and an interface to secure component to search for RDS.

FIG. 1 illustrates an electronic device supporting a UWB-based service according to an embodiment.

The electronic device (UWB device) 100 of FIG. 1 may be an electronic device supporting UWB ranging (e.g., UWB secure ranging), e.g., a smart ranging device.

Referring to FIG. 1, the electronic device 100 includes a UWB-enabled application layer 110, a common service & management layer 120, and a UWBS 130 including a UWB MAC layer and a UWB physical layer. Alternatively, some layers may not be included in the electronic device 100, or an additional layer (e.g., secure layer) may further be included.

The UWB-enabled application layer 110 is a layer of an application (e.g., FiRa-enabled application) using the framework API to constitute an OOB connector, secure service, and UWB service for, e.g., a UWB session.

The common service & management layer 120 defines a common component and procedure necessary to implement, e.g., UWB secure ranging.

The UWBS 130 is a component that includes a UWB MAC layer and a UWB physical layer. The UWBS may perform UWB-based communication for ranging (e.g., secure ranging) with the UWBS of another UWB device.

Figure 2:
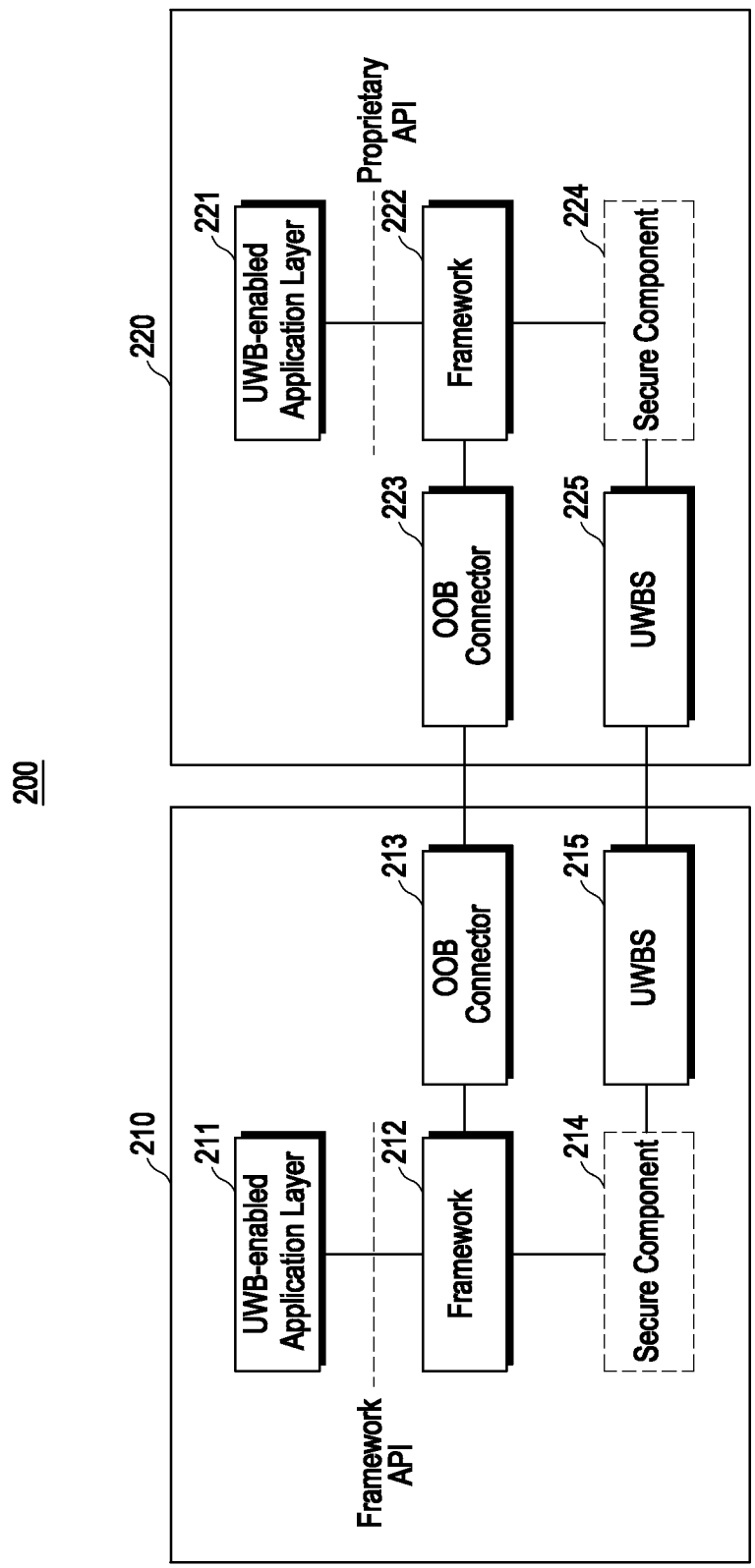
FIG. 2 illustrates an example configuration of a communication system including an electronic device supporting a UWB-based service.

FIG. 2 illustrates a communication system including an electronic device supporting a UWB-based service according to an embodiment.

Referring to FIG. 2, a communication system 200 includes a first electronic device 210 and a second electronic device 220. In an embodiment, the first electronic device (first UWB device) 210 may be, e.g., a smart ranging device, and the second electronic device (second UWB device) 220 may be, e.g., a ranging device. Both the first electronic device and the second electronic device may support UWB ranging (e.g., UWB secure ranging).

The first electronic device 210 may host one or more UWB-enabled applications 211 which may be installed by the user (e.g., a mobile phone application based on the framework API.) The second electronic device 220 does not provide a framework API, and may use a proprietary interface to implement a specific UWB-enabled application 221 provided only by the manufacturer.

Alternatively, both the first electronic device 210 and the second electronic device 220 may be smart ranging devices or ranging devices.

The first electronic device 210 and the second electronic device 220 may respectively include a UWB-enabled application layer 211, 221, a framework 212, 222, an OOB component/connector 213, 223, a secure component 214, 224, and/or a UWBS 215, 225. The framework API, framework, OOB connector and/or secure component may be included in the framework, and some components may be omitted according to an embodiment.

The first electronic device 210 and the second electronic device 220 may generate an OOB connection (channel) through the OOB connector 213, 223 (e.g., BLE connector) generate a UWB connection (channel) through the UWBS 215, 225, and communicate with each other.

Figure 3:
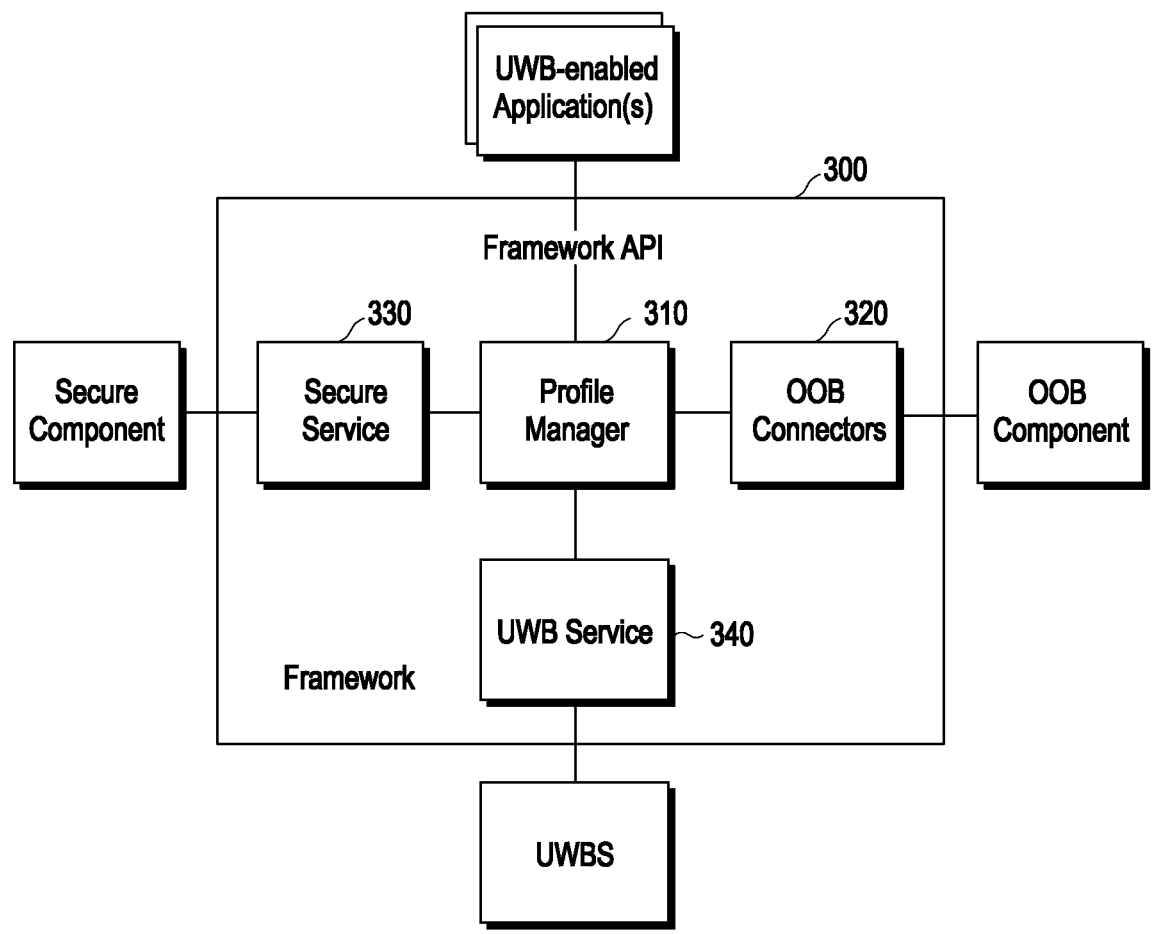
FIG. 3 illustrates an example configuration of a framework included in an electronic device supporting a UWB-based service according to an embodiment.

FIG. 3 illustrates a framework included in an electronic device supporting a UWB-based service according to an embodiment.

The framework 300 of FIG. 3 may be a FiRa framework.

The framework 300 may be a set of logical software components. The UWB-enabled application may interface with the framework 300 through the framework API provided by the framework 300.

Referring to FIG. 3, the framework 300 includes a profile manager 310, an OOB connector 320, a secure service 330, and a UWB service 340. Alternatively, some components may be omitted, and an additional component may further be included.

The profile manager 310 may manage a profile(s) available on the ranging device. The profile may be a set of UWB and OOB configuration parameters required to establish a successful UWB session between ranging devices. The profile manager 310 may abstract the UWB and OOB configuration parameters from the UWB-enabled application.

The OOB connector 320 may be a component for establishing an OOB connection between ranging devices. The OOB connector 320 may serve to interface with the 00B connector. The OOB connector 320 may handle the discovery phase and connection phase for providing a UWB-based service.

The secure service 330 may serve to interface with a secure component, such as an SE, eSE, or a TEE. The secure component may be a component that interfaces with the UWBS to transfer UWB ranging data to the UWBS.

The SE is a safe secure module based on tamper resistant characteristics and, if no contract relationship is established between various entities, installation and driving of an application are limited.

The eSE means a fixed SE fixed and used in the electronic device. Typically, the eSE is produced only for the terminal manufacturer at the request of the terminal manufacturer and include an operating system and/or a framework. For the eSE, a service control module in the form of an applet may be remotely downloaded and installed and be used for various security services, such as e-wallet, ticketing, e-passport, or digital key.

The TEE may be an S/W-centered security environment that creates a virtual separated environment based on, e.g., a code supported by a specific chipset (e.g., ARM-based). The TEE has tamper resistant characteristics but has the advantages of large available memory, high speed, and low costs as compared with the SE. Further, since various service providers are immediately available within a range allowed by the mobile manufacturer, the TEE has the advantage of low complexity between entities as compared with the SE.

The UWB service 340 may be a component that provides access to the UWBS.

Figure 4:
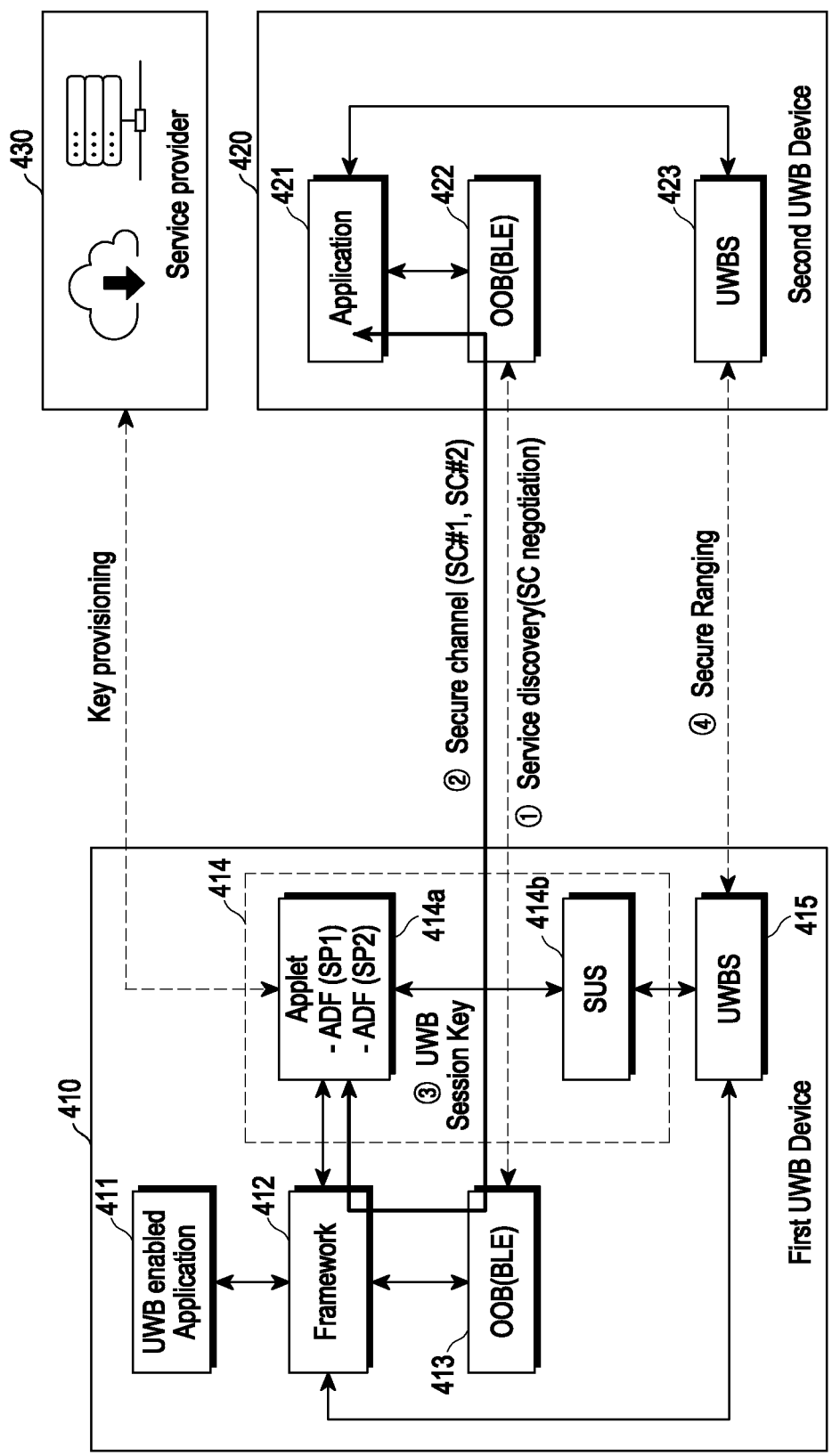
FIG. 4 illustrates a UWB device including a secure element (SE) performs secure ranging with another UWB device according to an embodiment.

FIG. 4 illustrates an operation in which a UWB device including an SE performs secure ranging with another UWB device according to an embodiment.

In FIG. 4, the first UWB device 410 may be a UWB device (e.g., FiRa smart device) including a secure element (e.g., eSE) as a secure component. The second UWB device 420 may be a UWB device (e.g., FiRa device) that performs secure ranging with the first UWB device 410. The service provider 430 may be an entity that provides the UWB-enabled application and plays a role to provision a key for secure ranging.

As described above, the SE is a safe security module based on the tamper resistant characteristics, and the eSE means a fixed SE fixed and used in the electronic device.

Referring to FIG. 4, the first electronic device 410 includes a UWB-enabled application 411, a framework 412, an OOB component 413, an SE 414, and a UWBS 415. The second electronic device 420 includes an application 421, an OOB component 422, and a UWBS 423. The UWB-enabled application, framework, and OOB component have been described above in connection with FIGS. 1 to 3.

The SE (e.g., eSE) 414 includes an applet (service applet) 414a and/or a secure UWB service (SUS) applet 414b. The applet 414a may include at least one ADF required to safely generate an RDS. For example, as shown, the applet 414a may include each ADF (ADF (SP1) and ADF (SP2)) provided by each SP. The ADF may be provided by the service provider in the key provisioning step. Further, the applet 414a may transfer the RDS through the SUS applet 414b to the UWBS 415. In an embodiment, the RDS may include a session ID and/or UWB session key for the UWB session.

The UWBS 415 manages the UWB hardware. The UWBS 415 may perform a UWB session with the UWBS of another ranging device. The UWBS 415 may be managed by the framework and receive an RDS necessary for secure ranging from the SE 414.

Referring to FIG. 4, in operation 1, the first UWB device 410 and the second UWB device 420 may perform a service discovery procedure through respective OOB components 413, 422. The service discovery procedure may include a secure channel (SC) negotiation operation. Thus, parameters for configuring an SC may be exchanged.

In operation 2, to safely share data, the first UWB device 410 and the second UWB device 420 may configure a secure channel (e.g., SC #1 and SC #2) therebetween, through the framework. The secure channel may be open through an OOB channel (connection). Through this secure channel, the RDS data including the UWB session key and/or session ID may be exchanged between the first UWB device 410 and the second UWB device 420. In an embodiment, the RDS data may be generated by the applet.

The RDS may include a ranging session key (UWB ranging session key) indicating the key used for securing the UWB ranging session and/or a session ID for identifying the RDS (or session associated with the RDS). In this case, the ranging session key and session ID should be the same in the initiator and the responder. Optionally, the RDS may further include at least one ranging parameter (e.g., angle of arrival (AoA), proximity distance), the AID of the applet to perform final authentication through a UWB secure channel, client-specific data and/or a multicast responder-specific key.

In operation 3, the RDS data including the UWB session key and the session ID may be exchanged between the applet 414a and the SUS applet 414b. For example, the URSK of the applet 414a may be transferred to the SUS applet 414b through communication with the SUS applet 414b. Further, the RDS data transferred to the SUS applet 414b may be transferred to the UWBS 415 for secure ranging. To that end, a secure channel between the applet and the SUS applet 414b and a secure channel between the SUS applet 414b and the UWBS 415 may first be configured. The UWBS 415 may obtain the corresponding RDS from the SUS applet 414b through the configured secure channel.

In operation 4, the first UWB device 410 and the second UWB device 420 may perform a secure ranging procedure. The obtained UWB session key may be used by the UWBSs 415, 423 for secure ranging. For example, the UWB session key may be used to generate an STS used for secure ranging.

Figure 5:
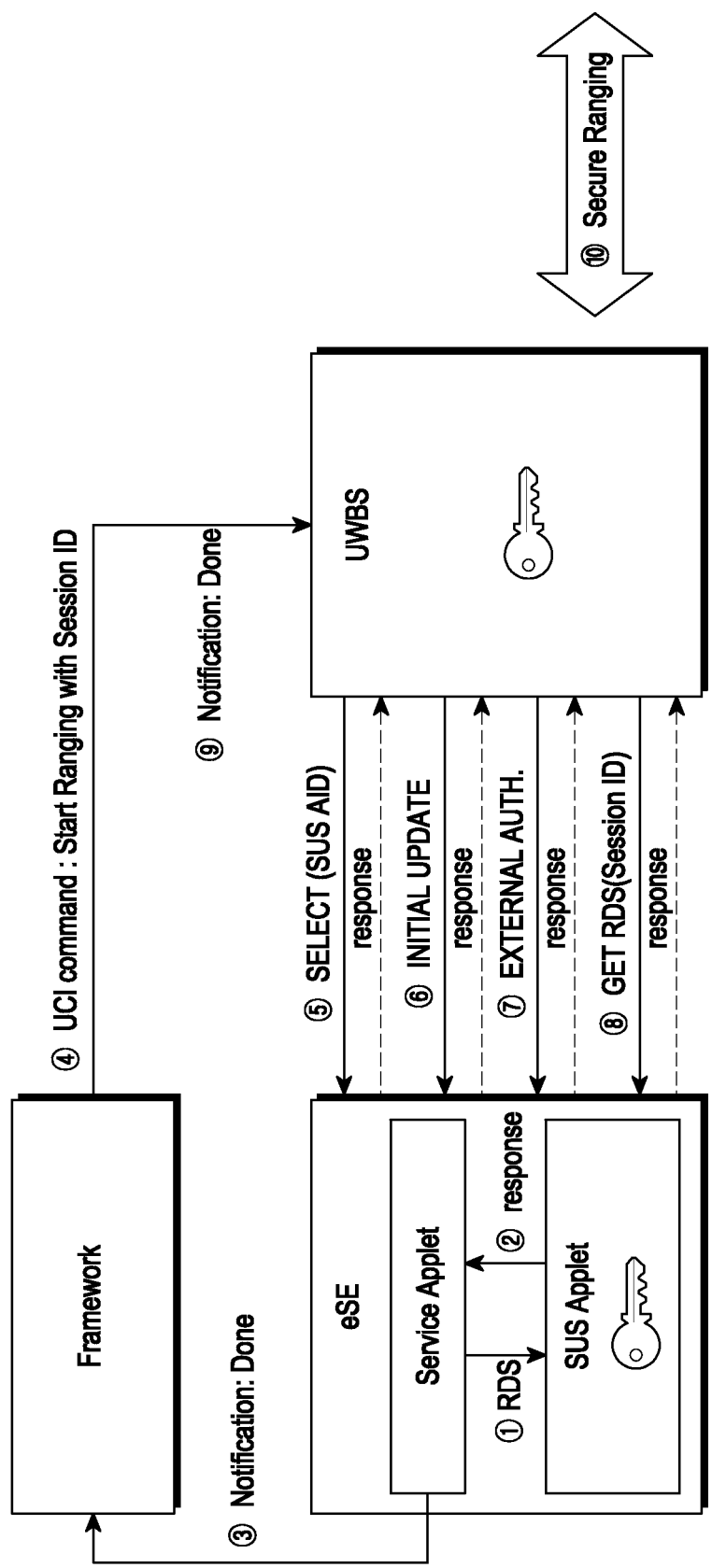
FIG. 5 illustrates a method in which a UWBS of a UWB device including an SE obtains a ranging data set for secure ranging according to an embodiment.

FIG. 5 illustrates a method in which a UWBS of a UWB device including an SE obtains a ranging data set for secure ranging according to an embodiment.

The UWB device of FIG. 5 may be the first UWB device of FIG. 4.

Referring to FIG. 5, the UWB device may include a framework, a secure component, and a UWBS. The secure component of FIG. 5 may be an eSE including an applet (service applet) and a SUS applet.

In operation 1, the applet may generate an RDS including a UWB session key and a session ID and transfer it to the SUS applet. In operation 2, the SUS applet may transfer a response to the reception of the RDS to the applet.

In operation 3, the eSE may transfer a notification indicating that the RDS has been transferred to the SUS applet to the framework. In an embodiment, this notification may include a session ID for identifying the RDS. In operation 4, the framework may transfer a command to start ranging (e.g., UCI command: start ranging) together with necessary parameters to the UWBS. In an embodiment, this command may include a session ID. Thus, the UWBS may initiate a procedure for performing ranging (secure ranging) for the session (ranging session) associated with the session ID.

To perform secure ranging, the UWBS should obtain the RDS from the SUS applet. To that end, the UWBS may initiate the procedure to obtain the RDS. For example, the UWBS may initiate a procedure including, e.g., operations 5 to 8, with the eSE (SUS applet) to obtain the RDS.

In operation 5, the UWBS may transmit a SELECT command including the AID of the SUS applet to the SUS applet, and the SUS applet may transmit a SELECT response corresponding to the SELECT command to the UWBS. Thus, an SUS applet to search for the RDS may be selected.

In operation 6, the UWBS may transmit an INITIALIZE UPDATE command to the SUS applet to initiate authentication (mutual authentication) for establishing a secure channel, and the SUS applet may transmit an INITIALIZE UPDATE response, corresponding to the INITIALIZE UPDATE command, to the UWBS. In operation 7, the UWBS may transmit an EXTERNAL AUTHENTICATE command for authentication to the SUS applet, and the SUS applet may transmit an EXTERNAL AUTHENTICATE response, corresponding to the EXTERNAL AUTHENTICATE command, to the UWBS. Through operations 6 and 7, a secure channel is configured between the UWBS and the SUS applet. For example, a secure channel may be configured between the UWBS and the user authentication. To configure such a secure channel, the UWBS should store the same symmetric key as the SUS applet in the eSE.

In operation 8, the UWBS may transmit a GET command for obtaining the RDS to the SUS applet, and the SUS applet may transmit a response corresponding to the GET command to the UWBS. In an embodiment, the GET command may include a session ID for identifying the RDS, and the response may include RDS data (e.g., ranging session key) corresponding to the session ID. Thus, the UWBS may obtain the RDS data.

In operation 9, the UWBS may transfer a notification indicating that the UWBS has obtained the RDS data to the framework.

In operation 10, the UWBS may perform secure ranging with the UWBS of another UWB device using the obtained RDS data. For example, the UWBS may perform secure ranging with the UWBS of the other UWB device using the STS generated using the ranging session key generated using the ranging session key of the RDS.

In the scheme of FIG. 5, since the UWBS needs to transfer multiple commands for performing encryption/message authentication operation to the SE (SUS applet) to obtain the RDS, an issue with performance may occur. Further, as the parameter, such as session ID, used for secure ranging should be exposed to the outside (e.g., framework) of the SE without being encrypted, an issue with security may arise. Further, since the UWBS having the nature of lower security than the SE should store the same symmetric key as the SE to configure a secure channel for RDS transfer, the security key may leak and, if the manufacturers of the SE and the UWBS differ, such an issue may arise where the different manufacturers should share the same security key. Embodiments for addressing such issues are described below with reference to the drawings.

Figure 6:
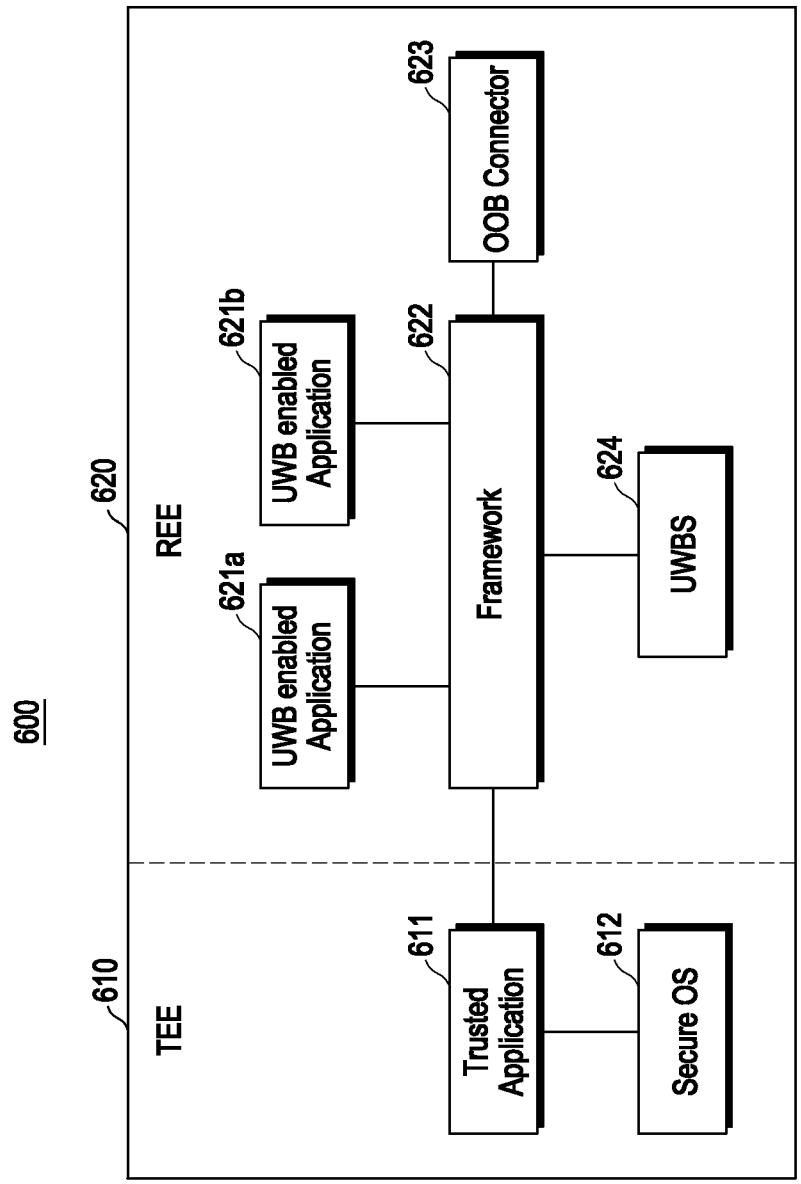
FIG. 6 illustrates a UWB device including a TEE according to an embodiment.

FIG. 6 illustrates a UWB device including a TEE according to an embodiment.

Referring to FIG. 6, a UWB device 600 includes a framework 622, a secure component 610, and a UWBS 624. The UWB device 600 may further include at least one UWB-enabled application 621a, 621b and OOB connector 623. The framework 622, UWBS 624, UWB-enabled application 621a, 621b, and OOB connector 623 of FIG. 6 may be, e.g., the framework, UWBS, UWB-enabled application, and OOB connector described above in connection with FIGS. 1 to 3.

The secure component according to FIG. 6 may be a TEE 610 including at least one trusted application (TA) 611 and secure OS (trusted OS) 612. The area of the UWB device may be divided into a TEE (TEE area) 610 and a rich operating system execution environment (REE) (REE area) 620.

The TEE 620 is an environment where code is executed and may have a high level of trust. In the TEE 610, trust may mean that it has a higher level of trust in the validity, isolation, and access control for items stored in the TEE area (space) as compared with general-purpose software environments. Accordingly, the TA 611 and secure OS 612 executed in the TEE 610 area may have higher trust. In an embodiment, the TEE 610 (or TA 611) may communicate with another component through a pre-defined interface (e.g., TEE client API). For example, the TEE client API may be used by the framework 622 to transfer the RDS to the UWBS 624. Further, the framework 622 may communicate with the UWBS 624 through a pre-defined interface (e.g., a UWB command interface (UCI)).

The TA 611 is the application of the TEE 610 and is denoted as TA to be distinguished from unclear characteristics of the application in the REE. In the disclosure, the TA 611 may serve to generate/store/transfer the RDS and may play a role as a contact point for the framework 622 (or the UWBS communicating with the framework). In the disclosure, the TA 611 may be identified by the ID (e.g., UUID) defined for the TA 611. In the disclosure, the TA 611 may also be denoted as a FiRa TA.

The secure OS 621 is an OS hosted by the TEE 610 and may be a trusted OS distinguished from the rich OS (e.g., Android) hosted by the REE of the device.

The UWBS 624 is positioned outside the TEE area.

In FIG. 6, the UWB device may be implemented to increase security, efficiency, and manageability, as described below.

(1) Security-Related

In the embodiment of FIG. 6, for security, the key (e.g., symmetric key) used in the UWB device 600 may be configured to be used only for a predetermined valid period. For example, the symmetric key used to encrypt the RDS may have an expiration date. Thus, as the important key for security is not stored for a long time, security may be increased. In the disclosure, the symmetric key used to encrypt the RDS may be denoted as an RDS encryption key, RDS encryption symmetric key, RDS security key, or RDS key.

The RDS may include a ranging session key (UWB ranging session key) indicating the key used for securing the UWB ranging session and/or a session ID for identifying the RDS (or session associated with the RDS). In this case, the ranging session key and session ID should be the same in the initiator and the responder of UWB ranging. The RDS may further include at least one ranging parameter (e.g., AoA, proximity distance), client-specific data and/or a multicast responder-specific key, as described below with reference to FIGS. 7 to 11.

(2) Efficiency-Related

In the case of the UWB device 600 of FIG. 6, for efficiency, roles may be distinguished between the UWBS 624 and the TEE 610 by reflecting the characteristic of the RSA algorithm that public key computation is fast, and private key computation is slow. For example, the UWBS 624 may be configured to perform public key computation (encryption), and the TEE 610 may be configured to perform private key computation (decryption). In this case, the UWBS 624 may serve to generate a symmetric key (secret key/private key) used to encrypt the RDS stored in the TA 611. The UWBS 624 may serve to encrypt the symmetric key generated using the public key of the TA 611 and transfer it to the TA 611 through the framework 622. The TA 611 may serve to extract (decrypt) the symmetric key transferred from the UWBS 624. The TA 611 may serve to encrypt the RDS using the extracted symmetric key and transfer it to the UWBS 624 through the framework 622.

It is possible for the UWBS 624 to more efficiently and quickly obtain the RDS from the TA 611 by setting the roles between the UWBS 624 and the TA 611 reflecting such RSA algorithm characteristic. However, embodiments are not necessarily limited thereto.

Although efficiency (encryption/decryption processing rate) may be decreased as compared with the above-described scheme, the TA 611 can be configured to perform public key computation (encryption) and the UWBS 624 can be configured to perform private key computation (decryption). In this case, the TA 611 may serve to generate a symmetric key (secret key/private key) used to encrypt the RDS stored in the TA 611. The TA 611 may serve to encrypt the symmetric key generated using the public key of the TA 611 (or UWBS 624) and transfer it to the UWBS through the framework. The TA 611 may serve to encrypt the RDS using the generated symmetric key and transfer it to the UWBS 624 through the framework 622. The UWBS 624 may serve to extract (decrypt) the symmetric key transferred from the TA 611. Further, the UWBS 624 may serve to decrypt the encrypted RDS transferred from the TA 611 using the extracted symmetric key.

The operations between the framework 622, UWBS 624, and TEE 610 may be configured so that fewer commands than in FIG. 5 may be communicated through the framework 622, rather than communication of many commands directly between the UWBS 624 and the TEE 611. This is described below with reference to FIGS. 7 to 11.

(3) Manageability-Related

In the case of the UWB device 600 of FIG. 6, for manageability, a TA certificate including the public key of the TA 611 may be configured to be stored in the UWBS 624. Thus, the symmetric key used to generate a secure channel for transfer the RDS between the secure component 610 and the UWBS 624 need not be shared between different manufacturers (vendors), as described below with reference to FIG. 9.

Figure 7:
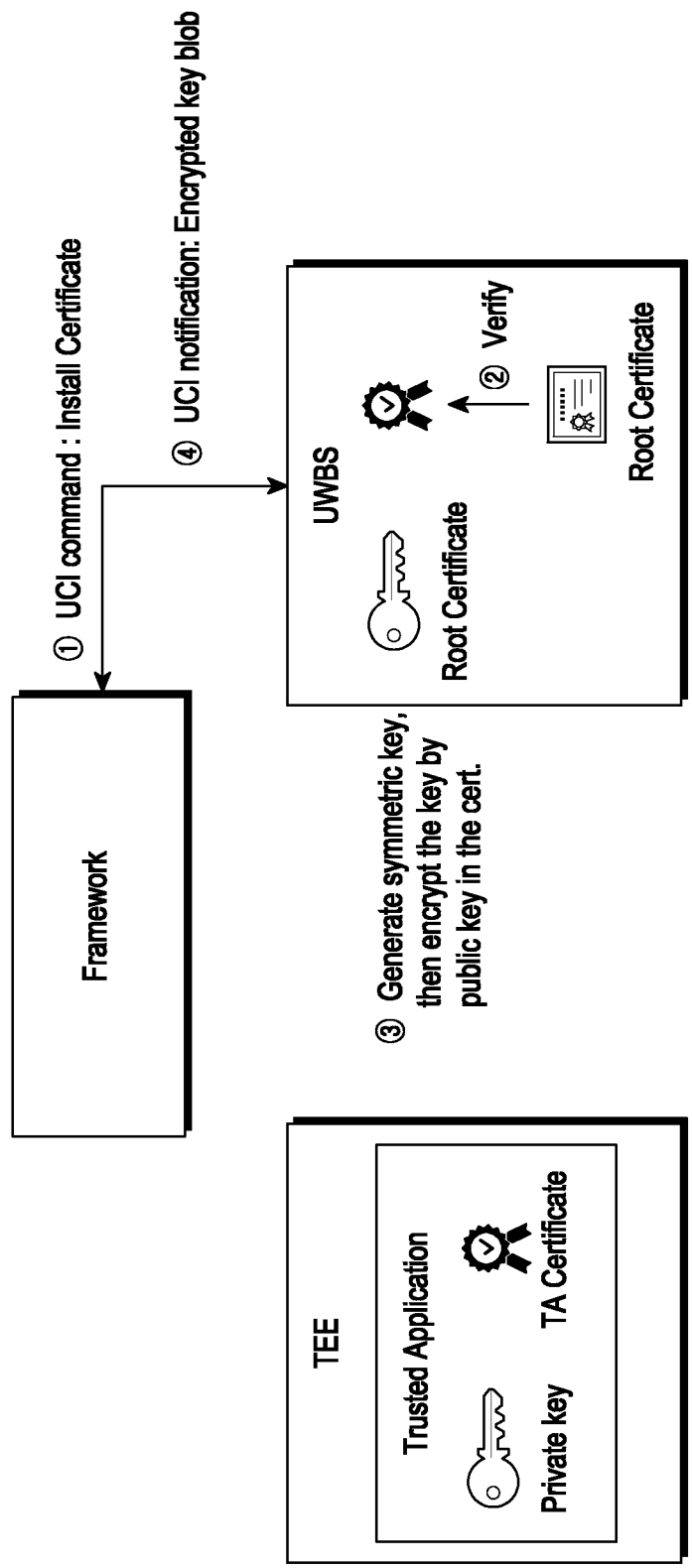
FIG. 7 illustrates a procedure performed between a UWBS and a framework for secure ranging in a UWB device according to an embodiment.

FIG. 7 illustrates a procedure performed between a UWBS and a framework for secure ranging in a UWB device according to an embodiment.

In FIG. 7, the UWB device may include the TEE of FIG. 6. In FIG. 7, the framework and the UWBS may communicate with each other using, e.g., a UCI interface (e.g., UCI command/response/notification).

In an embodiment, before the procedure between the framework and the UWBS is performed, the TA of the TEE may generate a private key and a public key and store them in the form of a certificate signed by the manufacturer (e.g., mobile OEM). The certificate may include the public key and/or private key of the TA.

In operation 1 of FIG. 7, the framework may transmit, e.g., a command to install a TA certificate (e.g., UCI command: Install Certificate) to the UWBS. The command may include the data of the TA certificate. In operation 2, the UWBS may verify the received TA certificate with a pre-stored root certificate. Thus, the verified TA certificate may be stored in the UWBS. An example of operations 1 and 2 is described below with reference to FIG. 9.

In operation 3 of FIG. 7, the UWBS may generate a symmetric key used to encrypt the RDS and encrypt the generated symmetric key with the public key in the TA certificate. In an embodiment, the UWBS may generate additional data (information) associated with the symmetric key, along with the symmetric key. In an embodiment, the additional data, along with the symmetric key, may be encrypted with the public key of the TA. Thus, encrypted key data (encrypted key blob) may be generated.

The additional data may include at least one of timestamp information about the symmetric key (e.g., timestamp indicating the time of generation of the symmetric key), information about the valid time of the symmetric key (e.g., information about the expiration time), information about the authority of the symmetric key (e.g., identification information (UUID) of the TA), information for the integrity of the symmetric key (e.g., IV), or random number information for identifying the freshness of the symmetric key (e.g., random value).

The symmetric key timestamp information and/or valid time information may be used to identify whether the symmetric key is valid or has expired. As the symmetric key may be used as valid only for a predetermined valid time through the timestamp information, security may be increased.

The information about the authority of the symmetric key may be used to identify the TA that will be given authority for the symmetric key. Thus, only the TA assigned authority may use the symmetric key, so that security may be increased.

The information for the integrity of the symmetric key may be used to protect the integrity of the symmetric key, as well as confidentiality. Thus, security may be increased.

The random number information of the symmetric key may be used to identify whether the symmetric key has been properly transferred to the TA.

In operation 4 of FIG. 7, the UWBS may transmit the encrypted key data to the framework. The encrypted key data may include the encrypted symmetric key and/or encrypted additional data. As shown, the UWBS may transmit the encrypted key data through a notification (e.g., UCI notification: Encrypted key blob). For example, when a predetermined event occurs (e.g., when an encrypted event or a symmetric key generation event occurs), the UWBS may generate and transmit a notification including the encrypted key data. In another embodiment, the UWBS may transmit the encrypted key data in response (e.g., UCI response: GET_ENCRYPTED_KEY_RSP) to a request (command) (e.g., UCI command: GET_ENCRYPTED_KEY_CMD) of the framework. The framework may transfer the encrypted key data to the TA. An example of operations 3 and 4 is described below with reference to FIG. 10.

Each of the above-described operations exemplifies a specific operation performed by each component, and the order of operations is not limited to the order described above. For example, each operation may be performed in an order different from the described order.

Figure 8:
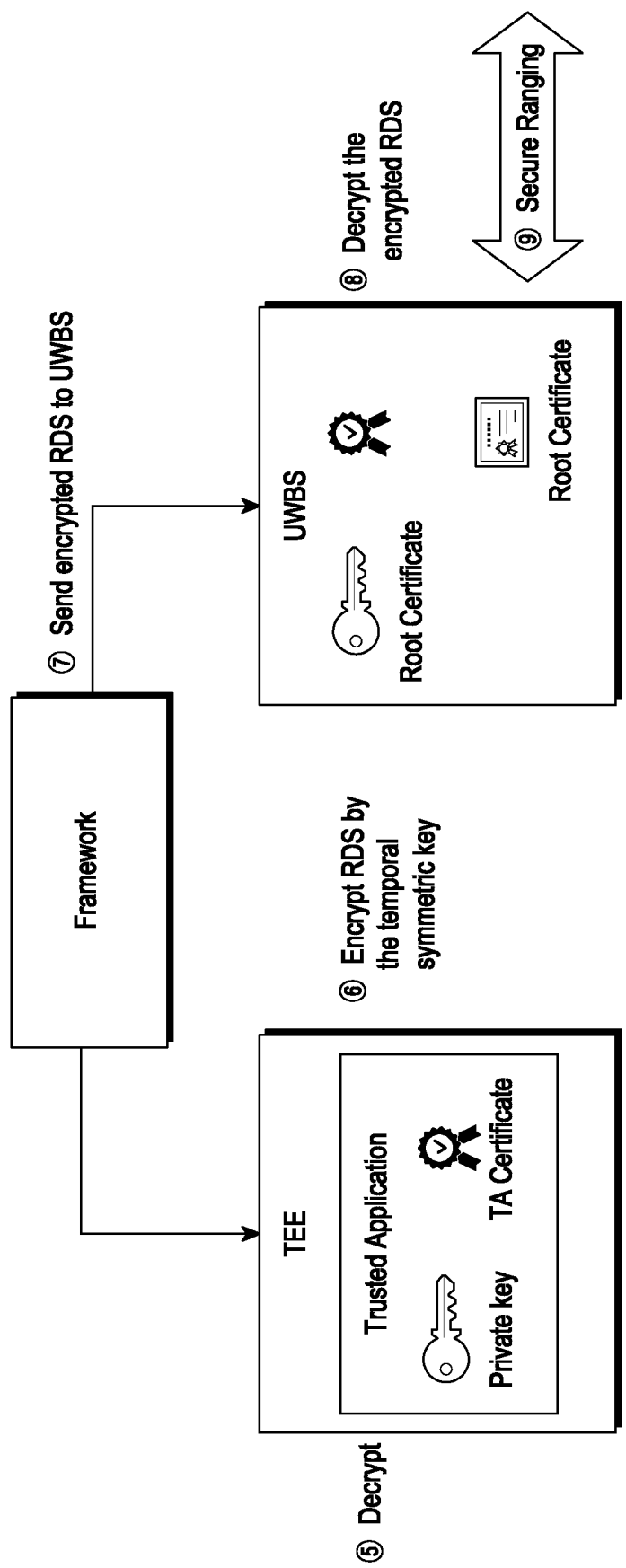
FIG. 8 illustrates a procedure performed between a framework and a TEE for secure ranging in a UWB device according to an embodiment.

FIG. 8 illustrates a procedure performed between a framework and a TEE for secure ranging in a UWB device according to an embodiment.

In FIG. 8, the UWB device may be a UWB device including the TEE of FIG. 6. The procedure of FIG. 8 may be a procedure performed after the procedure of FIG. 7. In FIG. 8, the operation performed by the TEE may be understood as a procedure performed by the TA of the TEE.

In FIG. 8, the framework and the UWBS may communicate with each other using, e.g., a UCI interface. Further, the framework and the TEE may communicate with each other using, e.g., a TEE client API.

In operation 5 of FIG. 8, the TA may decrypt the encrypted key data. In an embodiment, the TA may decrypt the encrypted key data using private key of the TA. As described above, the encrypted key data may include the encrypted symmetric key and/or encrypted additional data. By description, the TEE may obtain the symmetric key and additional data. Thus, the symmetric key for encrypting the RDS for secure ranging may be shared between the UWBS and the TA. Further, additional data for identifying, e.g., the validity or authority of the symmetric key may be used by the TA.

In operation 6 of FIG. 8, the TEE may encrypt the RDS with a temporal symmetric key. The TEE may transfer the encrypted RDS to the framework.

In operation 7 of FIG. 8, the framework may transmit the encrypted RDS to the UWBS. In an embodiment, the framework may use the UCI interface to transmit the encrypted RDS to the UWBS.

In operation 8 of FIG. 8, the UWBS may decrypt the encrypted RDS. In an embodiment, the UWBS may decrypt the encrypted RDS using a pre-shared symmetric key. By the decryption, the UWBS may normally obtain the RDS.

In operation 9 of FIG. 8, the UWBS may perform secure ranging using the RDS. For example, the UWBS may perform secure ranging with the UWBS of the other UWB device using the STS generated using the ranging session key generated using the ranging session key of the RDS. An example of operations 5 to 9 of FIG. 8 is described below with reference to FIGS. 10 and 11.

Each of the above-described operations exemplifies a specific operation performed by each component, and the order of operations is not limited to the order described above. For example, each operation may be performed in an order different from the described order.

Figure 9:
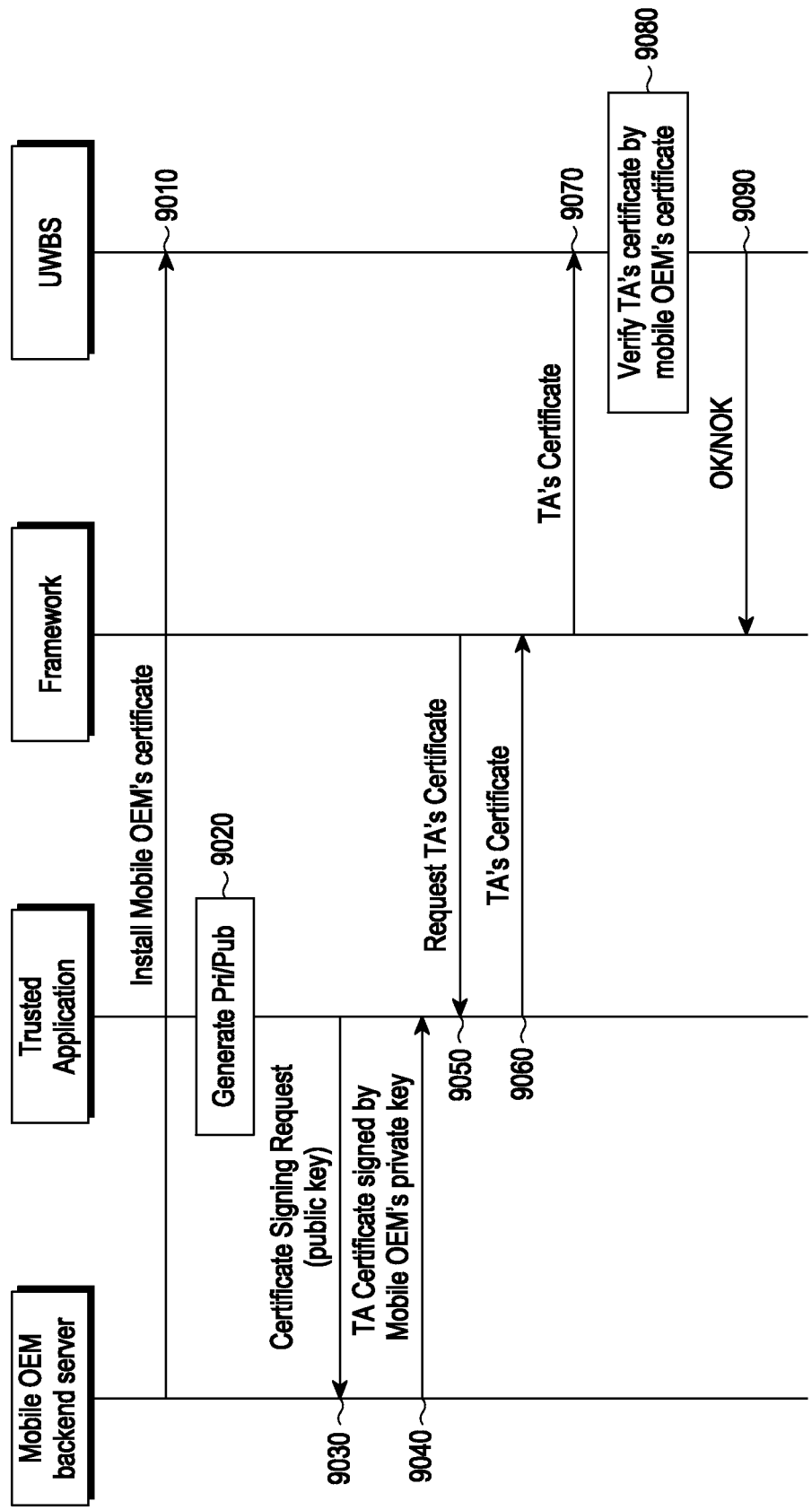
FIG. 9 illustrates a registration procedure of a UWB device according to an embodiment.

FIG. 9 illustrates a registration procedure of a UWB device according to an embodiment.

In FIG. 9, the UWB device may be a UWB device including the TEE of FIG. 6. The UWB device may include a TA (TEE), a framework, and a UWBS.

The registration procedure of FIG. 9 may be a procedure for previously registering data (information) necessary for the components of the UWB device. For example, the registration procedure may be a procedure for registering the TA certificate including the public key and/or private key of the TA in the UWBS.

The UWB device may perform a registration procedure with the manufacturer's server. In the disclosure, the manufacturer's server may be a server (e.g., mobile OEM backend server) operated by the manufacturer of the UWB device or the electronic device (e.g., mobile device) including the UWB device.

In operation 9010 of FIG. 9, the manufacturer's server may transfer a command (message) to install the manufacturer's certificate (e.g., mobile OEM's certificate) to the UWBS. The manufacturer's certificate may be denoted as a root certificate. Thus, the UWBS may store the manufacturer's root certificate. The root certificate may be used to verify the certificate of the TA signed by the manufacturer.

In operation 9020, the TA may generate a private key (Pri) and a public key (Pub) of the TA.

In operation 9030, the TA may transmit a certificate signing request for the certificate including the public key of the TA to the manufacturer's server. The certificate signing request may be used for the TA to obtain the TA certificate signed by the manufacturer. The manufacturer's server may generate a TA certificate signed with the manufacturer's key, based on the certificate signing request.

In operation 9040, the manufacturer's server may transmit the TA certificate signed with the manufacturer's private key (e.g., mobile OEM's private key) to the TA.

In operation 9050, the framework may request the TA certificate from the TA.

In operation 9060, the TA may transmit the TA certificate (signed TA certificate) to the framework based on the request.

In operation 9070, the framework may transmit the received TA certificate to the UWBS.

In operation 9080, the UWBS may verify the TA certificate based on a pre-stored manufacturer certificate (root certificate).

In operation 9090, the UWBS may transmit a result (e.g., OK/NOK) of verification for the TA certificate to the framework.

Through the registration procedure, the UWBS may obtain the TA certificate including the public key of the UWBS. The public key of the TA certificate may be used to encrypt the symmetric key generated by the UWBS, as described below with reference to FIG. 10.

Each of the above-described operations exemplifies a specific operation performed by each component, and the order of operations is not limited to the order described above. For example, each operation may be performed in an order different from the described order.

Figure 10:
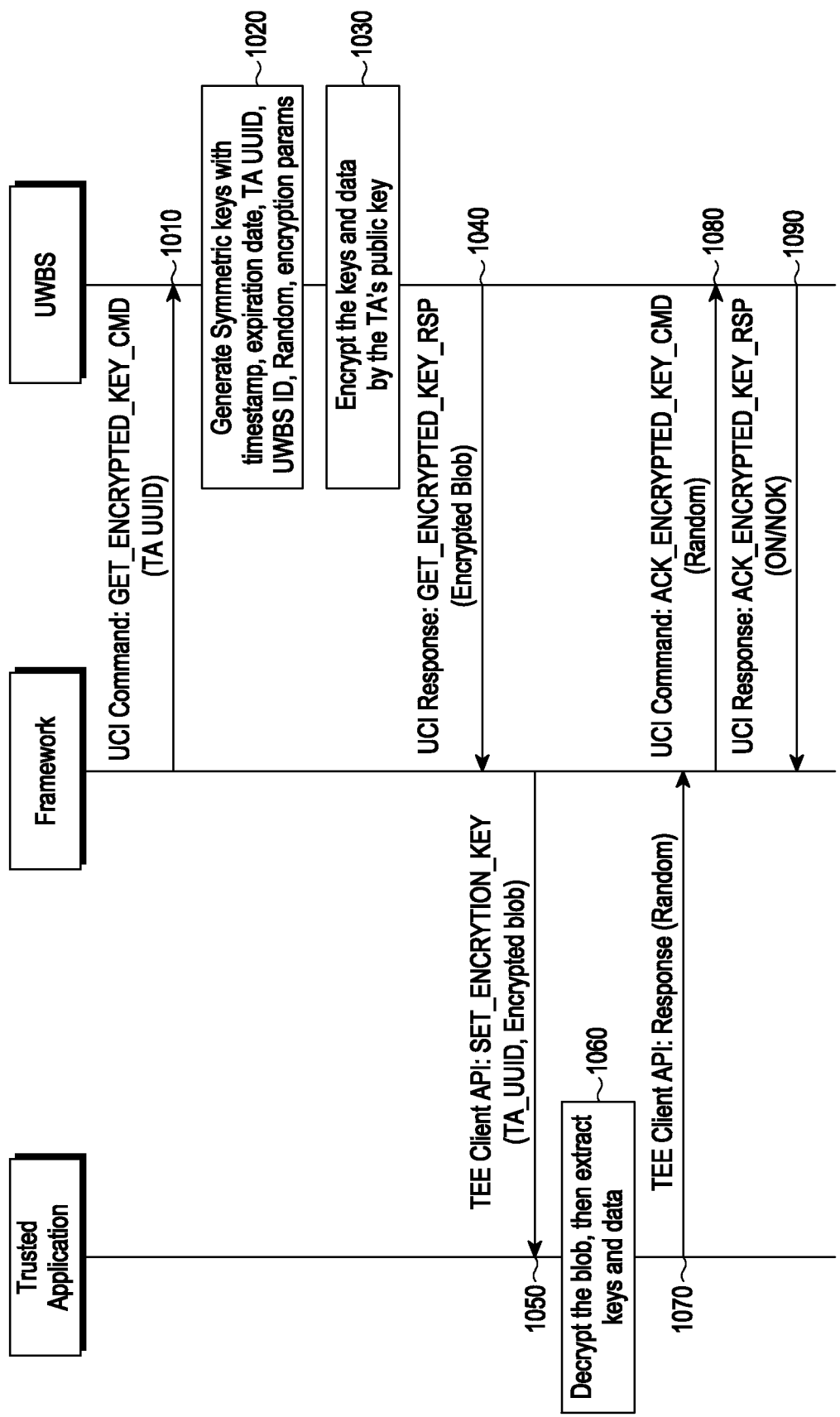
FIG. 10 illustrates a procedure in which a UWB device transfers an encrypted symmetric key according to an embodiment.

FIG. 10 illustrates a procedure in which a UWB device transfers an encrypted symmetric key according to an embodiment.

In FIG. 10, the UWB device may include the TEE of FIG. 6. As shown, the UWB device may include a TA (TEE), a framework, and a UWBS.

The transfer (sharing) procedure of the encrypted symmetric key of FIG. 10 may be a procedure for encrypting the symmetric key generated by the UWBS and transferring it to the TA through the framework.

As described above, the symmetric key may be used for the TA to encrypt the RDS.

In operation 1010 of FIG. 10, the framework may send a GET command (e.g., UCI command: GET_ENCRYPTED_KEY_CMD) to obtain the encrypted symmetric key from the UWBS to the UWBS. The GET command may include ID information for identifying the TA (e.g., the TA's UUID) as input. The GET command for obtaining the encrypted symmetric key from the UWBS may be referred to as an encryption key acquisition command.

In operation 1020, the UWBS may generate a symmetric key. In an embodiment, the UWBS may generate additional data (information) associated with the symmetric key, along with the symmetric key. The additional data may include at least one of timestamp information about the symmetric key (e.g., timestamp indicating the time of generation), information about the valid time of the symmetric key (e.g., information about the expiration time), information about the authority of the symmetric key (e.g., identification information (UUID) of the TA), information for the integrity of the symmetric key (e.g., IV or additional authentication data (aad)), or random number information for identifying the freshness of the symmetric key. The use of each piece of information (data) has been described above in connection with FIG. 6.

In operation 1030 of FIG. 10, the UWBS may encrypt the symmetric key and/or additional data with the public key of the TA in the TA certificate. Thus, encrypted key data (encrypted blob) may be generated. This may be referred to as first encryption data.

In operation 1040, the UWBS may transfer a response (e.g., UCI response: GET_ENCRYPTED_KEY_RSP) corresponding to the GET command to the framework. In an embodiment, the response may include encrypted key data. The encrypted key data may include the encrypted symmetric key and/or encrypted additional data.

In operation 1050, the framework may transmit a SET command (e.g., TEE client API: SET_ENCRYTION_KEY) for setting an encrypted key on the TA to the TA. In an embodiment, the SET command may include the ID information about the TA (e.g., the UUID of the TA) and/or encrypted key data as input. In an embodiment, the framework may send a SET command to the TA identified by the ID information about the TA. In the disclosure, a SET command for setting an encrypted key on the TA may be referred to as an encryption key setting command.

In operation 1060, the TA may decrypt the encrypted key data. In an embodiment, the TA may decrypt the encrypted key data using the TA's private key. Thus, the TA may obtain the symmetric key and/or additional data.

In operation 1070, the TA may transmit a response (e.g., TEE client API: Response) corresponding to the SET command to the framework. In an embodiment, the response may include a random number. In an embodiment, the random number may be a random value of random number information included in the additional data.

In operation 1080, the framework may transmit an ACK command (e.g., UCI command: ACK_ENCRYPTED_KEY_CMD) for requesting a reception acknowledgment (ACK) for the encrypted key (or encrypted key data) to the UWBS. In an embodiment, the ACK command may include the random number included in the response corresponding to the SET command. An ACK command for requesting a reception ACK for the encrypted key may be referred to as an encryption key identification command or an encryption key reception acknowledgment command.

In operation 1090, the UWBS may include a response (e.g., UCI response: ACK_ENCRYPTED_KEY_RSP) corresponding to the ACK command. In an embodiment, the response will send, to the framework, a value (OK) indicating that the received random value is equal to the generated random value or a value (NOK) indicating that the received random value is different from the generated random value. Thus, the framework may identify whether the symmetric key generated by the UWBS is normally received by the TA.

Through the encrypted symmetric key transfer procedure, the symmetric key generated by the UWBS may be transferred to the TA. Thus, the UWBS and the TA may share the same symmetric key used for encryption/decryption of RDS. In this case, the TA may encrypt the RDS with the symmetric key and transfer it to the UWBS, and the UWBS may decrypt the encrypted RDS with the symmetric key, as described below with reference to FIG. 11.

Each of the above-described operations exemplifies a specific operation performed by each component, and the order of operations is not limited to the order described above. For example, each operation may be performed in an order different from the described order.

Figure 11:
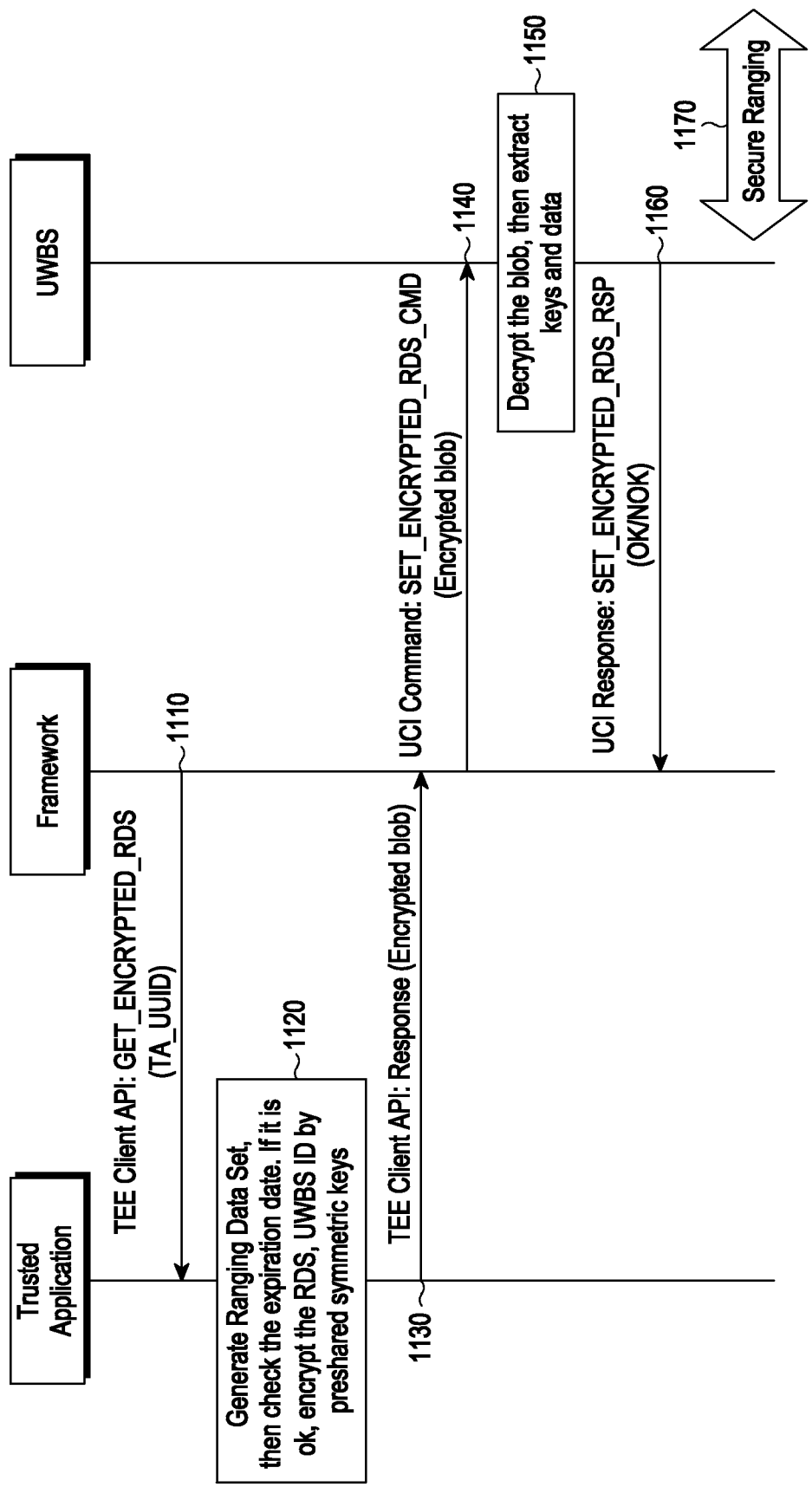
FIG. 11 illustrates a procedure in which a UWB device transfers an encrypted RDS according to an embodiment.

FIG. 11 illustrates a procedure in which a UWB device transfers an encrypted RDS according to an embodiment.

In FIG. 11, the UWB device may be a UWB device including the TEE of FIG. 6. As shown, the UWB device may include a TA (TEE), a framework, and a UWBS.

The procedure for transferring the encrypted RDS of FIG. 11 may be a procedure for transferring the encrypted RDS generated by the TA to the UWBS through the framework. As described above, the RDS may be used for security ranging.

In operation 1110 of FIG. 11, the framework may transmit, to the TA, a GET command (e.g., TEE client API: GET_ENCRYPTED_RDS) to obtain the encrypted RDS from the TA. In an embodiment, the GET command may include ID information about the TA (e.g., the TA's UUID) as input. The GET command for obtaining the encrypted RDS from the TA may be referred to as an encrypted RDS acquisition command.

In operation 1120, the TA may generate an RDS. The RDS may include a UWB ranging key and/or a session ID. Alternatively, the TA may identify whether a pre-shared symmetric key is valid. For example, the TA may identify whether the symmetric key is valid based on additional data (e.g., the expiration date of the symmetric key). If the symmetric key is valid (OK), the TA may encrypt the ID information about the UWBS and/or the RDS with the symmetric key.

In operation 1130, the TA may transmit, to the framework, a response (TEE client API: Response) corresponding to the GET command. The response may include encrypted data (encrypted blob). The encrypted data may include encrypted RDS and/or encrypted UWBS ID information, referred to as second encryption data.

In operation 1140, the framework may include a SET command (e.g., UCI command: SET_ENCRYPTED_RDS_CMD) for setting the encrypted RDS on UWBS. The SET command may include the encrypted data as input. The SET command for setting the encrypted RDS on the UWBS may be referred to as an encrypted RDS setting command.

In operation 1150, the UWBS may decrypt the encrypted data. The UWBS may decrypt the encrypted data using the pre-shared symmetric key. Thus, the UWBS may obtain the RDS.

In operation 1160, the UWBS may transmit a response (e.g., UCI response: SET_ENCRYPTED_RDS_RSP) corresponding to the SET command to the framework. The response may include a value (OK) indicating that the RDS is normally received or a value (NOK) indicating that the RDS is not normally received. Thus, the framework may identify whether the RDS transferred by the TA is well received by the UWBS.

In operation 1170, the UWBS may perform secure ranging with the UWBS of another UWB device using the RDS. For example, the UWBS may perform secure ranging with the UWBS of the other UWB device using the STS generated using the ranging session key generated using the ranging session key of the RDS.

Each of the above-described operations exemplifies a specific operation performed by each component, and the order of operations is not limited to the order described above.

In the embodiment described above in connection with FIGS. 6 to 11, an example has been described in which the UWB device includes a TEE as a secure component, and the UWBS of the UWB device generates/encrypts an RDS encryption key, and the TEE of the UWB device decrypts the RDS encryption key. Although the embodiment is preferable for providing high security and efficiency as compared with other embodiments, embodiments of the disclosure are not necessarily limited thereto.

For example, even when the UWB device includes an SE (eSE) as a secure component, the above-described embodiment may also apply. In this case, e.g., the SUS applet of the eSE may play a role as the TA of the TEE in the above-described embodiment. As another example, the above-described embodiment may also apply even where the TEE of the UWB device generates/encrypts the RDS encryption key, and the UWBS of the UWB device plays a role to decrypt the RDS encryption key.

Figure 12:
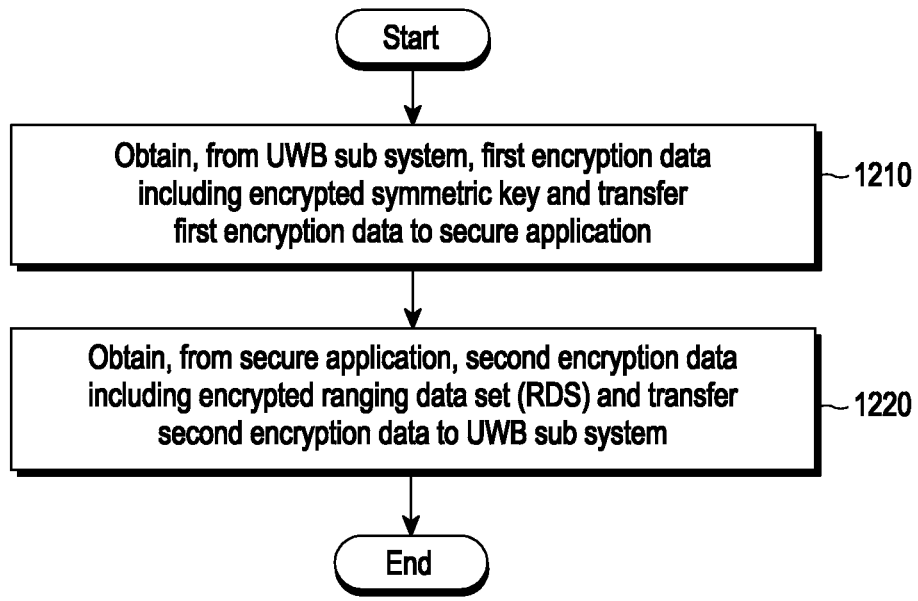
FIG. 12 is a flowchart illustrating a method of a UWB device according to an embodiment.

FIG. 12 is a flowchart illustrating a method of a UWB device according to an embodiment.

In FIG. 12, the UWB device may be the UWB device of FIG. 6. The UWB device may include a framework, a security component, and a UWBS. The security component may be a TEE including a TA. The method of FIG. 12 may be performed by the framework (or a controller) of the UWB device.

Referring to FIG. 12, in operation 1210, first encryption data including a symmetric key encrypted by the public key of the secure application (TA) may be obtained from the UWB device and the first encryption data is transferred to the secure application. Operation 1210 may be performed according to the procedure/operations exemplified in FIGS. 7 and 10.

Operation 1210 may include transmitting an encryption key acquisition command including identification information about the secure application to a UWB sub-system, receiving, from the UWB sub-system, a response corresponding to the encryption key acquisition command, including the first encryption data, and transmitting, to the secure application, an encryption key setting command including the identification information about the secure application and the first encryption data. In another embodiment, operation 1210 may include receiving, from the secure application, a response corresponding to the encryption key setting command, including random number information included in additional data associated with the symmetric key obtained from the first encryption data, transmitting, to the UWB sub-system, an encryption key ACK command, including the random number information, and receiving, from the UWB sub-system, a response corresponding to the encryption key acknowledgment command, including a value based on the random number information.

In operation 1220, the UWB device may obtain second encryption data including an RDS encrypted with the symmetric key from the secure application and transfer the second encryption data to the UWB sub-system. Operation 1220 may be performed according to the procedure/operations exemplified in FIGS. 8 and 11.

Operation 1220 may include transmitting an encryption RDS acquisition command including identification information about the secure application to the secure application, receiving, from the secure application, a response corresponding to the encryption RDS acquisition command, including the second encryption data, transmitting, to the UWB sub-system, an encryption RDS setting command including the second encryption data, and receiving, from the UWB sub-system, a response corresponding to the encryption RDS setting command. In an embodiment, the second encryption data may further include identification information about the UWB sub-system encrypted with the symmetric key.

The symmetric key is generated and encrypted by the UWB sub-system, and the RDS includes a ranging session key used to secure the UWB ranging session. The secure application may be included in the TEE area.

The first encryption data may further include additional data encrypted with the public key of the secure application. The additional data may include at least one of information for indicating the valid time of the symmetric key, information about the authority of the symmetric key, information for protecting the integrity of the symmetric key, or random number information associated with the symmetric key.

Figure 13:
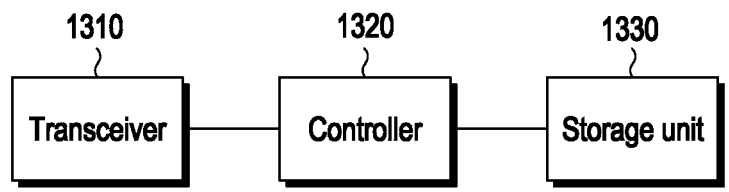
FIG. 13 illustrates a structure of an electronic device according to an embodiment.

FIG. 13 illustrates a structure of an electronic device according to an embodiment.

In FIG. 13, the electronic device may correspond to the UWB device of FIG. 6 or may be an electronic device including the UWB device of FIG. 6.

Referring to FIG. 13, the electronic device includes a transceiver 1310, a controller 1320, and a storage unit 1330. The controller may be defined as a circuit or application-specific integrated circuit or at least one processor.

The transceiver 1310 may transmit and receive signals to/from other network entities. The transceiver 1310 may transmit/receive data for UWB ranging using, e.g., UWB communication.

The controller 1320 may control the overall operation of the electronic device. For example, the controller 1320 may control inter-block signal flow to perform the operations according to the above-described flowchart. Specifically, the controller 1320 may control the operations of the electronic device described above with reference to FIGS. 1 to 12.

The storage unit 1330 may store at least one of information transmitted/received via the transceiver 1310 and information generated via the controller 1320. For example, the storage unit 1330 may store information and data necessary for secure ranging described above with reference to FIGS. 1 to 12.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, singular forms, e.g., a, an, and the, are intended to include the plural forms as well, unless the context clearly indicates otherwise.

While the disclosure has been particularly shown and described with reference to certain embodiments thereof, it will be understood by those of ordinary skill in the art that various changes in form and details may be made thereto without departing from the scope of the disclosure as defined by the appended claims and their equivalents.

What is claimed is:

1. A method for performing a secure ranging by a first ultra-wide band (UWB) device, the method comprising:
obtaining, from a UWB sub-system of the first UWB device, first encryption data including a symmetric key encrypted with a public key of a secure application of the first UWB device;
transferring the first encryption data to the secure application;
obtaining, from the secure application, second encryption data including a ranging data set (RDS) encrypted with the symmetric key;
transferring the second encryption data to the UWB sub-system, and
performing the secure ranging with a second UWB device based on the second encryption data,
wherein the symmetric key is generated and encrypted by the UWB sub-system,
wherein the RDS includes a ranging session key used to secure an UWB ranging session,
wherein the secure application is included in a trusted execution environment (TEE) area,
wherein the public key is generated by the secure application and transferred to the UWB sub-system via a certificate of the secure application, and
wherein the certificate of the secure application is stored in the UWB sub-system.

2. The method of claim 1, wherein the first encryption data further includes additional data encrypted with the public key of the secure application, and
wherein the additional data includes at least one of information for indicating a valid time of the symmetric key, information about an authority of the symmetric key, information for protecting an integrity of the symmetric key, or random number information associated with the symmetric key.

3. The method of claim 1, wherein obtaining the first encryption data from the UWB sub-system and transferring the first encryption data to the secure application include:
transmitting, to the UWB sub-system, an encryption key acquisition command including identification information about the secure application;
receiving, from the UWB sub-system, a response corresponding to the encryption key acquisition command and the first encryption data; and
transmitting, to the secure application, an encryption key setting command including the first encryption data and the identification information about the secure application.

4. The method of claim 3, wherein obtaining the first encryption data from the UWB sub-system and transferring the first encryption data to the secure application include:
- receiving, from the secure application, a response corresponding to the encryption key setting command and random number information included in additional data associated with the symmetric key obtained from the first encryption data;
- transmitting, to the UWB sub-system, an encryption key acknowledgment (ACK) command including the random number information; and
- receiving, from the UWB sub-system, a response corresponding to the encryption key ACK command and a value based on the random number information.

5. The method of claim 1, wherein obtaining the second encryption data from the secure application and transferring the second encryption data to the UWB sub-system include:
- transmitting, to the secure application, an encryption RDS acquisition command including identification information of the secure application;
- receiving, from the secure application, a response corresponding to the encryption RDS acquisition command and the second encryption data;
- transmitting, to the UWB sub-system, an encryption RDS setting command including the second encryption data; and
- receiving, from the UWB sub-system, a response corresponding to the encryption RDS setting command, wherein the second encryption data further includes identification information of the UWB sub-system encrypted with the symmetric key.

6. The method of claim 1, wherein the UWB sub-system is located outside the TEE area.

7. The method of claim 1, wherein the secure application is a trusted application executed in the TEE area.

8. The method of claim 1, wherein the symmetric key is generated by the UWB sub-system.

9. A first ultra-wide band (UWB) device for performing secure ranging, the first UWB device comprising:
- a memory;
- a transceiver; and
- a controller operationally connected with the memory and the transceiver,
- wherein the controller is configured to:
  - obtain, from a UWB sub-system of the first UWB device, first encryption data including a symmetric key encrypted with a public key of a secure application of the first UWB device,
  - transfer the first encryption data to the secure application,
  - obtain, from the secure application, second encryption data including a ranging data set (RDS) encrypted with the symmetric key,
  - transfer the second encryption data to the UWB sub-system, and
  - performing the secure ranging with a second UWB device based on the second encryption data,
- wherein the symmetric key is generated and encrypted by the UWB sub-system,
- wherein the RDS includes a ranging session key used to secure an UWB ranging session,
- wherein the secure application is included in a trusted execution environment (TEE) area,
- wherein the public key is generated by the secure application and transferred to the UWB sub-system via a certificate of the secure application, and
- wherein the certificate of the secure application is stored in the UWB sub-system.

10. The first UWB device of claim 9, wherein the first encryption data further includes additional data encrypted with the public key of the secure application, and
wherein the additional data includes at least one of information for indicating a valid time of the symmetric key, information about an authority of the symmetric key, information for protecting an integrity of the symmetric key, or random number information associated with the symmetric key.

11. The first UWB device of claim 9, wherein the controller is further configured to:
- transmit, to the UWB sub-system, an encryption key acquisition command including identification information about the secure application;
- receive, from the UWB sub-system, a response corresponding to the encryption key acquisition command and the first encryption data; and
- transmit, to the secure application, an encryption key setting command including the first encryption data and the identification information about the secure application.

12. The first UWB device of claim 11, wherein the controller is further configured to:
- receive, from the secure application, a response corresponding to the encryption key setting command and random number information included in additional data associated with the symmetric key obtained from the first encryption data;
- transmit, to the UWB sub-system, an encryption key acknowledgment (ACK) command including the random number information; and
- receive, from the UWB sub-system, a response corresponding to the encryption key ACK command and a value based on the random number information.

13. The first UWB device of claim 9, wherein the controller is further configured to:
- transmit, to the secure application, an encryption RDS acquisition command including identification information of the secure application;
- receive, from the secure application, a response corresponding to the encryption RDS acquisition command and the second encryption data;
- transmit, to the UWB sub-system, an encryption RDS setting command including the second encryption data; and
- receive, from the UWB sub-system, a response corresponding to the encryption RDS setting command, and wherein the second encryption data further includes identification information of the UWB sub-system encrypted with the symmetric key.

14. The first UWB device of claim 13, wherein the UWB sub-system is located outside the TEE area.

15. The first UWB device of claim 9, wherein the secure application is a trusted application executed in the TEE area.

16. The first UWB device of claim 9, wherein the symmetric key is generated by the UWB sub-system.

* * * * *